US009009725B2

(12) United States Patent (10) Patent No.: US 9,009,725 B2
Biondi et al. (45) Date of Patent: Apr. 14, 2015

(54) SYSTEM OF GROWTH AND AUTOMATED MIGRATION

(75) Inventors: Amy Biondi, Kennedale, TX (US);
Brian Coffey, Saginaw, TX (US);
Timothy Criste, Houston, TX (US);
Kevin Dunn, Richardson, TX (US);
Blaine Thomas, Allen, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 1387 days.

(21) Appl. No.: 12/203,046

(22) Filed: Sep. 2, 2008

(65) Prior Publication Data

US 2010/0057757 A1 Mar. 4, 2010

(51) Int. Cl.
G06F 17/30 (2006.01)
G06F 9/50 (2006.01)
G06Q 10/10 (2012.01)

(52) U.S. Cl.
CPC .............. G06F 9/5038 (2013.01); G06Q 10/10 (2013.01)

(58) Field of Classification Search
USPC ......................................................... 718/106
See application file for complete search history.

(56) References Cited

U.S. PATENT DOCUMENTS

| 5,535,322 | A  | * | 7/1996 | Hecht ............................ 705/301 |
| 5,655,086 | A  | * | 8/1997 | Jury et al. ..................... 705/7.15 |
| 5,960,404 | A  | * | 9/1999 | Chaar et al. ................... 705/7.26 |
| 6,539,419 | B2 | * | 3/2003 | Beck et al. ..................... 709/204 |
| 6,560,649 | B1 | * | 5/2003 | Mullen et al. ................. 709/226 |
| 7,043,714 | B2 | * | 5/2006 | Lin et al. ........................ 717/102 |
| 7,668,864 | B2 | * | 2/2010 | Benson et al. ................. 707/608 |
| 7,734,491 | B2 | * | 6/2010 | Kayahara et al. ............. 705/7.23 |
| 8,165,908 | B2 | * | 4/2012 | Bolle et al. ................... 705/7.27 |
| 2004/0139114 | A1 | * | 7/2004 | Shalabi et al. ............. 707/104.1 |
| 2006/0218028 | A1 | * | 9/2006 | Kelly et al. ....................... 705/8 |
| 2007/0203778 | A1 | * | 8/2007 | Lowson et al. ..................... 705/9 |
| 2008/0092199 | A1 | * | 4/2008 | McCarthy et al. ............. 725/133 |
| 2008/0147774 | A1 | * | 6/2008 | Tummalapenta et al. .... 709/202 |

OTHER PUBLICATIONS

Pyron,Tim., Special Edition Using Microsoft Project 2002, Aug. 5, 2002, Que pub. Chapter 5,outlining task list section,19 pages.*

* cited by examiner

Primary Examiner — Eric Coleman
(74) Attorney, Agent, or Firm — Baker & Hostetler LLP

(57) ABSTRACT

A combination of workflow management tools is utilized to implement a logical system that supports the needs of both simple and complex workflow environments. Team members may access a central database to collaborate on a project via user interfaces with work item functionality, such as creation, reporting, performance, updates, and communications. Select management of work items may be automated. Work items may represent server-oriented tasks and sub-tasks and may be ticketed and tracked. A knowledge base may provide help for the system application, such as online or live access to access helpful information. In an example embodiment, the workflow management tools are implemented to support the creation of a Video Hub Office project.

27 Claims, 6 Drawing Sheets

SYSTEM OF GROWTH AND AUTOMATED MIGRATION

BACKGROUND

Multiple servers may be implemented into a project, each having associated with it multiple work items that need to be complete to complete a phase of the project. Work items may represent server-oriented tasks and sub-tasks. A project may be complete when all of the tasks and sub-tasks associated with each server are complete. Managing such a project may be in the form of a checklist of tasks and sub-tasks designated to each server. Each server may be remotely located with respect to each other, each having a database that maintains the status of the work items via the checklist, for example.

Current systems for managing project completion lack proper workflow management, interdepartmental communication, problem tracking, accurate accountability, automation, and proper storage. For example, a spreadsheet or use of email may collectively keep track of work items, requirements, and status of each. However, these are often inefficient forms of communicating minutiae in large projects, particularly where numerous people are involved. Some systems provide a project requirements checklist, but lacks proper work flow management, interdepartmental communication, problem tracking, and accurate accountability. A SharePoint/driver is utilized as a problem tracking tool, but often lacks a logical flow that accurately pinpoints causation and easy reference to previous solutions. With multiple clients/servers, tracking work items in the existing methods is extremely inefficient. Improper storage of problems and solutions results in often misplaced information or inaccessibility among multiple team members. And, existing automation of scripts running in a project require large amounts of manual intervention. To date, the combination of various aspects of workflow management into a logical system has been limited.

Therefore, it would be desirable to have an extensible workflow management tool capable of initiating, organizing, tracking, and expediting status, changes, and completion of work items to support the completion of a project or series of projects.

SUMMARY

Described herein are a combination of multiple workflow management tools that make up a logical system to support the needs of both simple and complex workflow environments. The techniques combine initiating, organizing, tracking, and expediting status, changes, and completion of work items to support the completion of a project or series of projects. A work item managing component may store and track individual work items for a project. Team members may access a central database to collaborate on a project via a user interface with work item functionality, such as creation, reporting, performance, updates, and communications. Select management of work items may be automated. A knowledge base may provide help for the system application, such as online or live access to access helpful information. In an example embodiment, the workflow management tools are implemented to support the creation of a Video Hub Office project.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION OF ILLUSTRATIVE EMBODIMENTS

Disclosed herein are workflow management techniques for initiating, organizing, tracking, driving, providing accountability for, and expediting status, changes, and completion of work items to support the completion of a project or series of projects. The workflow management techniques include methods for tracking work items and the status and completion thereof, accessing a knowledge base, interfacing with the techniques via user interfaces, and system automation. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

Figure 1:
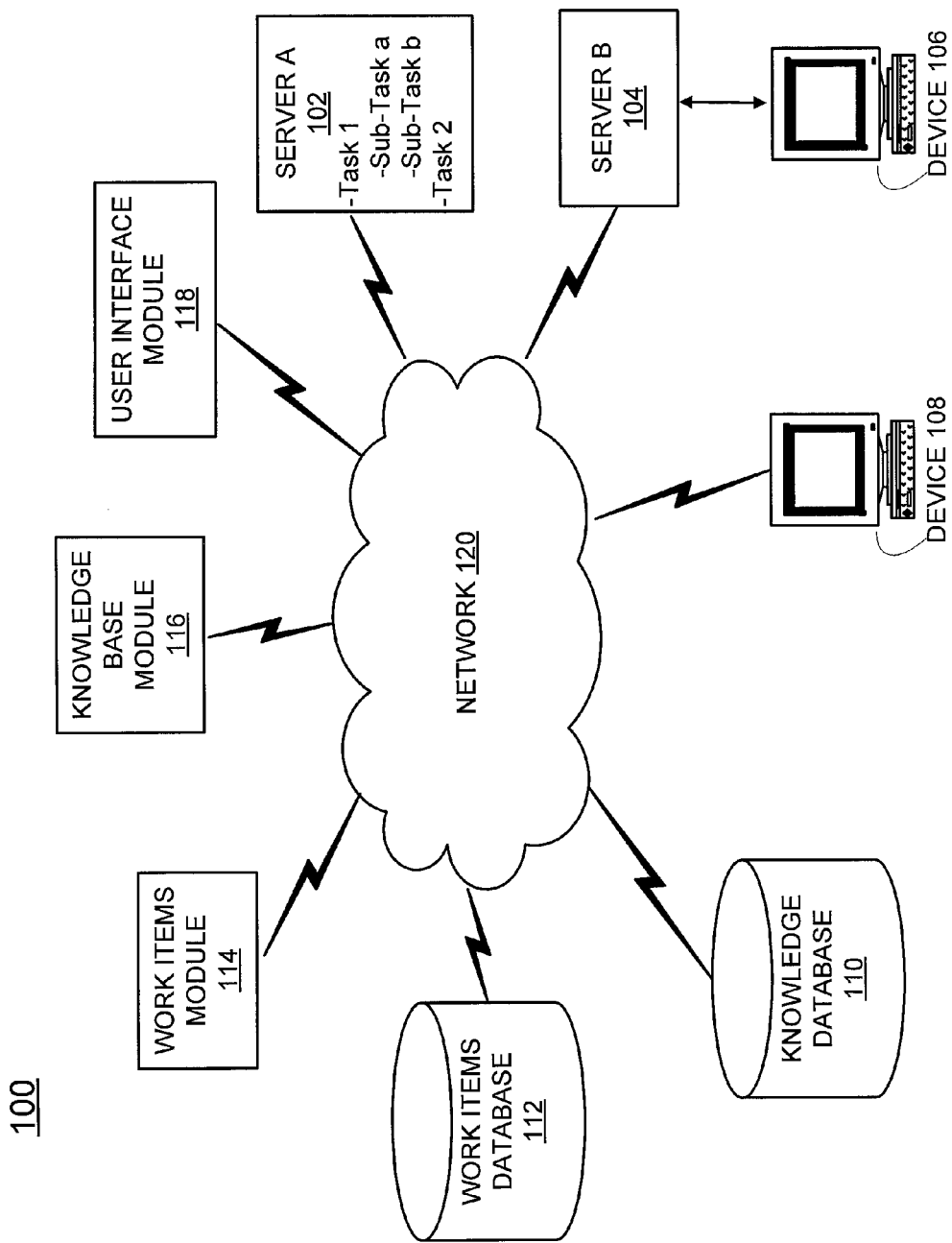
FIG. 1 illustrates an example system in which aspects of the workflow management techniques described herein may be employed.

FIG. 1 illustrates an example system 100 in which aspects of the workflow management techniques described herein may be employed. System 100 may include server A 102, server B 104, computing devices 106 and 108, knowledge database 110, work items database 112, work items module 114, knowledge based module 116, and user interface module 118. Server A 102, server B 104, computing devices 106 and 108, knowledge database 110, work items database 112, work items module 114, knowledge based module 116, and user interface module 118 are shown in FIG. 1 capable of communicating with one another by way of a network 120, such as a computing network, for example. The network 120 may include, for example, an intranet, the Internet, a local area network (LAN), a wide area network (WAN), a public switched telephone network (PSTN), a cellular network, a voice over internet protocol (VoIP) network, and the like, for example.

Each computing device 106 and 108 may be accessed by team members and may run computing applications relevant to the project. A user of system 100, such as a project team member, may have access to various user interfaces maintained by user interface module 118 via computing device 106 or 108, for example. A computing device 106 or 108 may be a multimedia console, a personal computer (PC), a gaming console, a handheld computing device, a PDA, a mobile phone, or the like. Although only two servers A and B, 102, 104, and two devices 106, 108 are shown, and a single device 106 is shown associated with a single server B 104, it is contemplated that the system 100 may have any number and any combination of servers and associated computing devices. A single computing device, such as 106, may support multiple users.

The user interface module 118 may be a processor or include processing for work item functionality. Work items may be tasks related to the project that need to be completed for a completion of that project or a particular build or phase of that project. The work items may be tasks and broken down into sub-tasks that are server-designated. For example, server A may include Task 1 and Task 2, and Task 1 may include Sub-Task a and Sub-Task b. Thus, these tasks and sub-tasks are associated to Server A. A portion of the project that is to be completed at or by Server A may not be considered complete until each of the tasks and sub-tasks are complete.

Work Items Module 114 may track the individual work items for a project and aggregate them to facilitate a more efficient work flow. A user, via a user interface maintained by user interface module 118, may access the status of the work items tracked by the Work Items Module 114. The Knowledge Base Module 116 may be a help feature for the applications include in system 100 in support of project completion. For example, if a user interface provides a method for a user to request status of a particular work item, the Knowledge Base Module may provide a tutorial to the user as to how to perform the desired request. Similarly, if a user interface provides a method for a user to request status of a particular work item, the User Interface Module 118 may communicate with the Work Items Module 114 to perform the request.

The Knowledge Database 110 may contain an inventory of help information, such as a structured collection of records and/or data associated with the applications used in system 100. The Work Items Database 112 may contain an inventory of work item information. The Work Items database 112 may operate to store multiple server identifiers, where each server identifier is associated with a particular work item. A server identifier may include information related to the work item and a device 106 or 108, for example, associated with a particular work item.

The information in the Knowledge Database 110 and Work Items Database 112 may be structured to enable a person or program to extract desired information to share information about the user. The Knowledge Database 110 and Work Items database 112 may be any form of data storage, including a storage module, device, or memory, for example. The Knowledge Database 110 and Work Items database 112 may be provided as a database management system, an object-oriented database management system, a relational database management system (e.g. DB2, Access, etc), a file system, or another conventional database package. Further, the databases can be accessed via a Structure Query Language (SQL), or other tools known to one of ordinary skill in the art.

Figure 2:
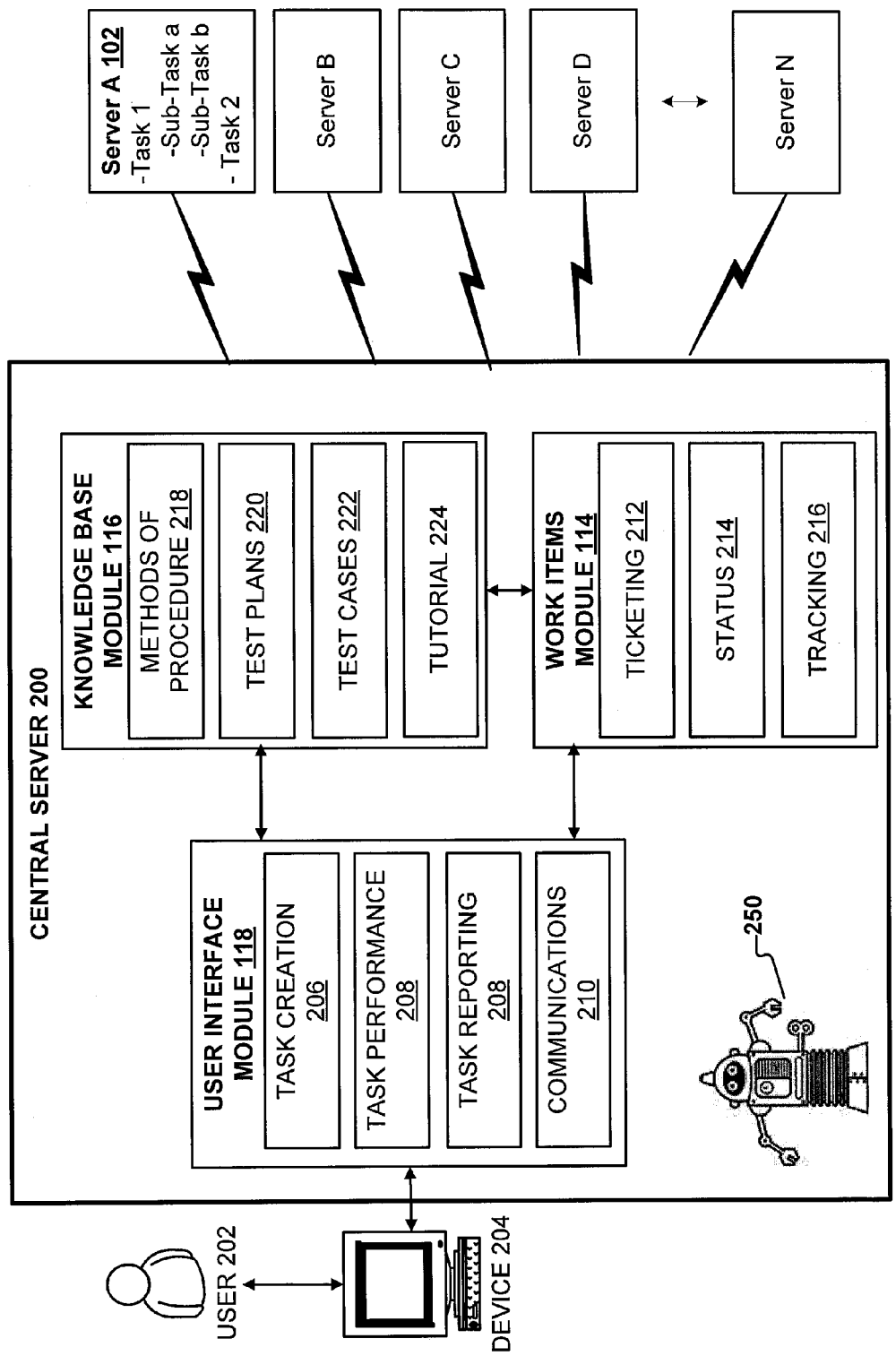
FIG. 2 depicts example embodiments modules in a workflow management tool.

FIG. 2 depicts example embodiments of User Interface Module 118, Work Items Module 116, and Knowledge Base Module 116. As shown in FIG. 2, a central server 200 may maintain the User Interface Module 118, Knowledge Module 116, Work Items Module 114, Work Items Database 112, and Knowledge Database 110. The Central Server 200 has a connection to any number of servers. FIG. 2 shows example Server A, Server B, Server C, Server D, and Server N, where N represents any number of additional servers that may be integrated into the project. Server A is shown with example Tasks and Sub-Tasks, designated to Server A.

The example User Interface Module 118 is shown with four processes, Task Creation 206, Task Performance 208, Task Reporting 208, and Communications 210. Task Creation 206 may be an administrative user interface designed for the creation and correction of the hierarchy for work items. For example, as new tasks are created, the user may use the Task Creation 206 process to organize the tasks appropriately among the servers. Task Performance 208 may be a user interface available for assigning and performing sub-tasks. Task Reporting 208 may be an interface that provides the overall status of the project or of individual work items. Communications 210 may be an interface that shares, broadcasts, or otherwise communicates high priority issues and overdue statuses relating to the project.

The User Interface Module 118 may manage work based on a time line that can change dynamically. A user 202, for example, may make changes via a user interface that dynamically changes the time line of work items that are created, reported, communicated, or performed, for example. The User Interface Module 118 may expose potential missed dates and work force loads based on all the work tasks that need to be completed before crucial deadlines.

The example Work Items Module 114 manages work flow for new build, growth, and migration of work items. The Tracking 216 process may maintain the work items in a hierarchical arrangement of work items, broken into server oriented tasks and sub-tasks. The Status 214 process may track the status of individual work items, the status of each server, as well as the overall project status Ticketing 212 may keep track of ticket items, such as open work items, notes added by users, flags to prerequisite items, and the like. The Work Items Module 114 supports the Task Reporting 208 user interface.

Tracking and storing work items via the Work Items Module 114 may utilize a database such that a single database maintains a record for all projects that are currently managed by various servers. The Central Server 200 may maintain this database. The database may be shared among several Central Servers, each supporting a single project. Alternately, many projects may be supported by a single Central Server and a database may track each of those projects.

The Knowledge Base Module 116 includes access to Methods of Procedure 218, Test Plans 220, Test Cases 222, and Tutorials 224. Each of these support the help feature of the Knowledge Base Module 116. The help features, such as the Methods of Procedure 218, Test Plans 220, Test Cases 222, and Tutorials 224, may be applicable for system applications running as part of the project or for help in testing and verifying the work items in the project. The help features may assist the user in how to use the user interfaces, to track work items, to input information into the Knowledge Base Module 114 or Work Items Module 114, or the like. The Methods of Procedure 218, Test Plans 220, Test Cases 222, and Tutorials 224 may be available online within the workflow system or they may be web accessible. The Knowledge Base Module 116 may maintain the history of each work item, solutions that resulted in success, problem areas, and the like.

A user, such as user 202, may access user interfaces via a computing device 204. Access to the processes in the User Interface Module 118 may be limited. For example, a particular user interface may only be available to select users, such as team members or administrators, or access to a user interface or portions of the user interface may be read-only, for example. The computing device 204 may be part of a network with the central server 200 and Servers A, B, C, D . . . N. A computing device may also be directly connected to any one of the Servers A, B, C, D . . . N. A directly connected computing device may also enable access to the User Interface Module 118. Similarly, any computing devices that are part of the network with Central Server 200 may provide access to the User Interface Module 118, the Knowledge Base Module 116, and the Work Items Module 114.

The workflow management system described herein may integrate system automation 250. Integrated system automation is the ability to launch existing scripts and perform future automation enhancement that will expedite the workflow of a project. As the installation scripting code base becomes larger and more broad, more work items will be automated within the application. Automation may provide a positive record of assignment in a shortened period of time using fewer staff to perform the work. Eliminating the human element assists in uniformity, reducing fallout, and insuring consistency in the configurations.

The combination of components that make up the workflow management system described herein enable proper work flow management, interdepartmental communication, problem tracking, and accurate accountability. A team member, such as user 202, may use the logical system to add additional work items (e.g., via the Task Creation 206 process), pinpoint work items that are open (e.g., via the Work Items Module 114), and identify the reasons why and find an easy reference to previous solutions or possible solutions Knowledge Base Module 116). Multiple users are connected and accountability may be assigned to the appropriate individuals.

Figure 3:
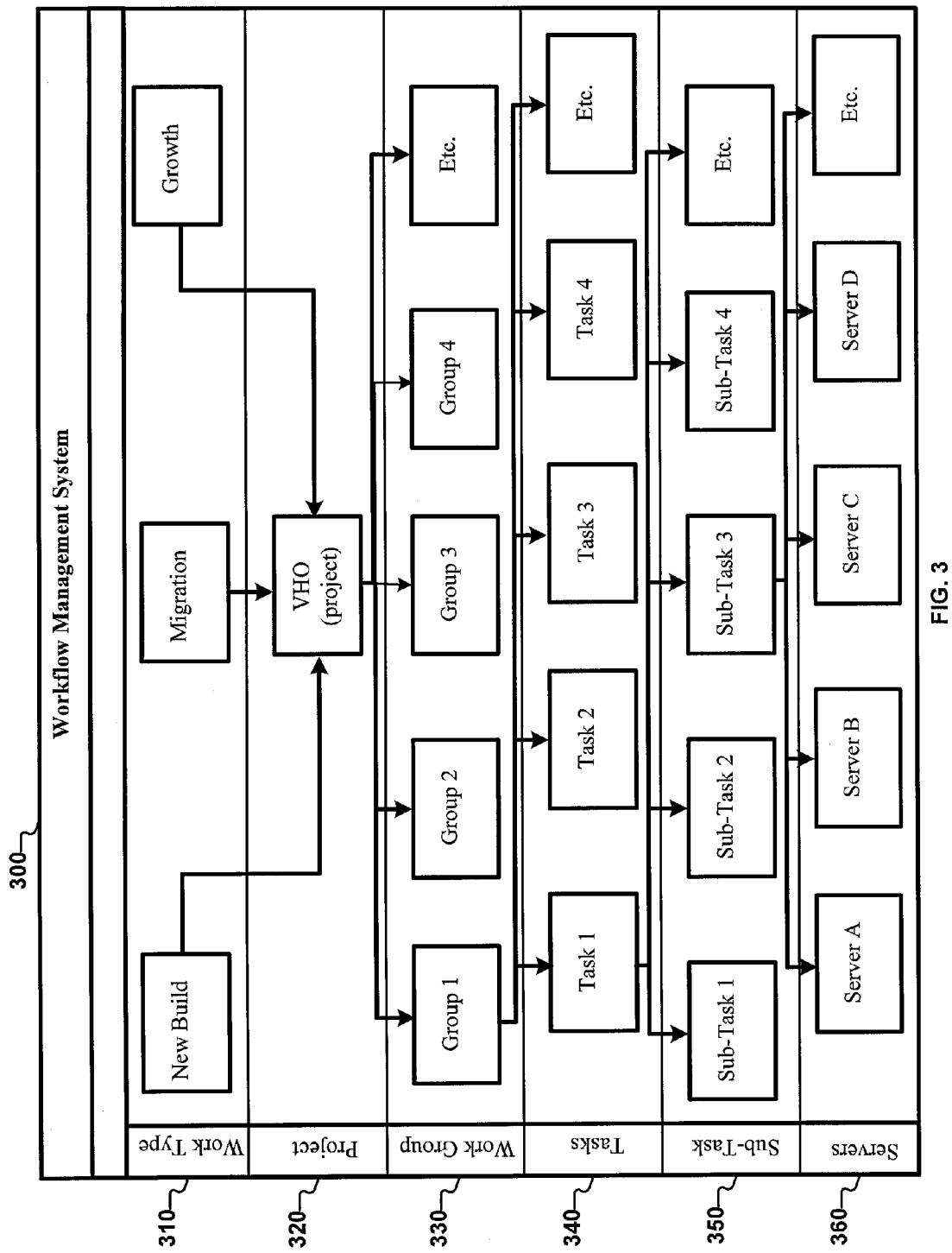
FIG. 3 depicts an example work flow of a Video Hub Office (VHO) project that would benefit from a workflow management system.

FIG. 3 depicts an example work flow for use with a workflow management system. The project in FIG. 3 is a Video Hub Office (VHO) project. Because each VHO project may be unique and based on tasks performed at multiple remote servers, the workflow for the VHO project is an example project that may benefit from a workflow management system 300. Also, the work type 310 of a VHO project may be a new build, a growth, or a migration, so upgrades and tracking changes may be complicated. The workflow management system 300 includes the following lanes: a work type 310 (e.g., new build, migration, or growth), a project 320 (e.g., a VHO project), work groups 330 (e.g., Groups 1, 2, 3, 4, etc), task types 340 (e.g., Tasks 1, 2, 3, 4, etc), Sub-Tasks (e.g., Sub-Tasks 1, 2, 3, 4, etc) and Servers 360 (e.g., Server A, B, C, D, etc). The example VHO project is discussed with respect to the workflow management system 200 shown in FIG. 2.

A new VHO project 320 may enter the Workflow lifecycle process as one of the three project work types 310, New Build, Migration, or Growth based on VHO. Each pending/new VHO project flow may be built based on a current project or work type template. The work type/VHO project relationship may be built by automated input or a select group of users. Dates (e.g., project start, light date, phases, due dates, etc) may be provided by this relationship. Each VHO project 320 may have a unique name that contains the required tasks necessary for building that particular VHO. A user can view one of the user interfaces to view the tasks that are active. When a task status is updated, it may be moved from the active tasks list and moved to a completed tasks list.

Each work group in lane 330 may have its own set of tasks, such as those shown in lane 340, with a series of sub-tasks associated with each task, such as those shown in lane 350. For example, Group 1 is shown associated with each of the Tasks 1—etc. in Tasks lane 340. Tasks or Sub-Tasks may be implemented as tickets, for example. Tickets may be created on Work Type 310 & VHO 320, Work Group 330, Tasks 340, and Sub-Task 350 in order to track project progress. All servers in lane 360 may be built into the system at the work item level of task. Users would have the ability to add a problem tracker on one or multiple servers in order to create a dependent item (problem, ticket, etc) and to show a failure point and then track the necessary steps to resolution.

The priority of each event may be driven by the weight of an event, where an event is an individual item in each of the lanes, 310-360, shown in FIG. 3. Successful completion for a task or task type may need to occur within its respective phase. Incomplete tasks/task types may add a certain amount of weight to the overall project, indicating that if this task/task type isn't complete, the project will fall behind. A notification may be sent to waiting/subtending teams upon completion of task/sub-task (e.g., via Task Reporting 208 shown in FIG. 2).

The User Interface Module 118 (see FIG. 2) may provide four functions in this example VHO project: Task Creation, Task Performance, Task Reporting and Communications. Task Creation requires an "administrative" interface to create and correct the hierarchy for the work items. Task Performance is the input or user interface for assigning and performing each sub-task. Task Reporting or "Dashboard" reflects a VHO project's current status via various metric reports. Finally, Communication or "Whiteboard" would share/broadcast/communicate high priority issues and overdue statuses relating to a VHO project.

Task Performance is user interface to manage the flow of work for a particular project. The use would access a specific VHO project with a unique user type to perform the next server sub-task required to move the VHO project to completion.

Task Creation (and modification) is an administrative interface to input VHO project criteria as well as make changes. The interface allows a select group of users to apply changes to one or many templates at a time would be highly convenient. These changes apply in two distinct manners. The first is initial template creation that specifies all tasks and hierarchy. The second is template modification. Once a template has been used to initiate a VHO project, changes in active template need to be reflected in active VHO projects. An example would be when fixes from one VHO project need to be applied to other VHO projects.

A Dash board, or Task Reporting, will report status for each VHO project in the Web Application. Status reports range from high level overviews of VHO project to logs for current work items or server tasks. The "Dashboard" reports would report on important items, key success and key failure points. The reports may include statistical analysis of projects, including tasks, milestones, project variance, trend forecasting, duration times of tasks, human resource allocation, actual project times, completion percentage at each level of the project, and efficiencies related to each or all of the tasks, milestones, and project(s). Reporting may be accomplished via a two-pronged approach: Static reports and Ad-hoc reports. Static reports that are long standing and needed for reporting status of the project. They would be long-term additions to the project. Ad-hoc reports are user-made and on-the-fly reporting. They are possibly one time reports, possibly staging ground for static reporting.

Additionally, visual reporting is to be made available. It would have a calendar function that would display upcoming dates for new projects. A White Board facilitates out of cycle communication relevant to a VHO projects. It hi-lights new priority items and log status of existing items to multiple VHO stakeholders simultaneously. As an alternate notification method (beyond Q, and e-mail), it focuses discussion on VHO projects and allow efficient "catching up" to multiple recipients what progress was made. It should be built as one-to-many types of notifications. Two types of notifications: a) Manager-to-Subordinate notifications and b) Group-to-Group notifications.

The Work Items Module 114 may keep track of the progression of the VHO project. Progression of the VHO project may be controlled by successful completion of specific tasks in the system, to allow subtending tasks to be worked. If the prerequisites of a task are not met, system progression may not continue, but a ticket may be reported showing "not ready to work task for <specific> reason."

Tracking 216 from Work Items Module 114 may provide for all change/add/removal of work items in the system. If a work item that is already completed changes before the project is complete, the system may create a new ticket and force completion of that ticket before any other ticket could progress. Alternately, if the item is in the current lifecycle phase, the system may just create a new ticket and normal system requirements would apply. In this example embodiment, Tracking 216 may allow tracking certain things based on ticket status.

Work Items Module 114 may track the individual work items for a VHO project and aggregate them to facilitate a more efficient work flow. The ticketing system tracking will use a hierarchical arrangement of work items to input a new VHO as a project, break it down into server oriented subtasks, organize the subtasks, and track a VHO project's completion status. The most granular level of work items (called sub-stasks) are at the server level will use a Pass/Fail criteria for completion. The hierarchical arrangement of work items will facilitate tracking and reporting. At higher level, the work items will serve additional purpose beyond tracking completion status and perform a secondary role as Process Management.

The Knowledge Base Module 116 may keep track of templates for projects, such as in Test Plans 220 or Methods of Procedure 218. Knowledge Base is the help feature for the Web Based Workflow Application as well as the Workflow process itself. Methods of Procedure, test plans, test cases and how-to s will be made available online within the Lifecycle Workflow System.

Using the application requires two sets of knowledge: 1) how the VHO project work items are performed and 2) how to perform the work items within the Lifecycle Management Workflow web application. All work items or tasks must have an M&P associated to it. These should be a link on the ticket to allow easy lookup. A possible interface for a select group of people to manage those relationships would be convenient. The users would also need a lookup utility on ticket logs to search for previous resolutions.

As new features are added to the web application tool and as new users are added to the Web Application, online documentation should be available to document the applications capabilities and the expected result.

Multiple project templates based on work type may be supported in a production/historical fashion. This would allow a first VHO project 320 to be built and maintained on a Template 1, and a second VHO project to be on Template 2. A user interface, such as one of those provided by User Interface Module 118, may allow a select group of users to apply changes to one or many templates at any time.

After the initial set of task types and tasks are set, a select group of users may need to be able to modify the order, add and remove tasks and task types within an established VHO project as needed. Any modifications to the task type or task (add, remove, change order), may affect all VHO projects in progress and all new VHOs for that project template. These modifications and changes could be made via the User Interface Module 118, such as through Task Creation 206.

Integrated System Automation is the ability to launch existing scripts and perform future automation enhancement that will speed up the workflow of a project VHO. As the Installation scripting code base becomes larger and broader, more work items will be automated within the Workflow Web Application. All automation currently completed by a manual process in the VHO needs to be built into the system. Doing so will severely reduce manual work for the users. The two types described in relation to the VHO project are a system-initiated automation, which is started upon completion of a task and scheduled runs to perform based on requirements, and a user-initiated automation.

Figure 4:
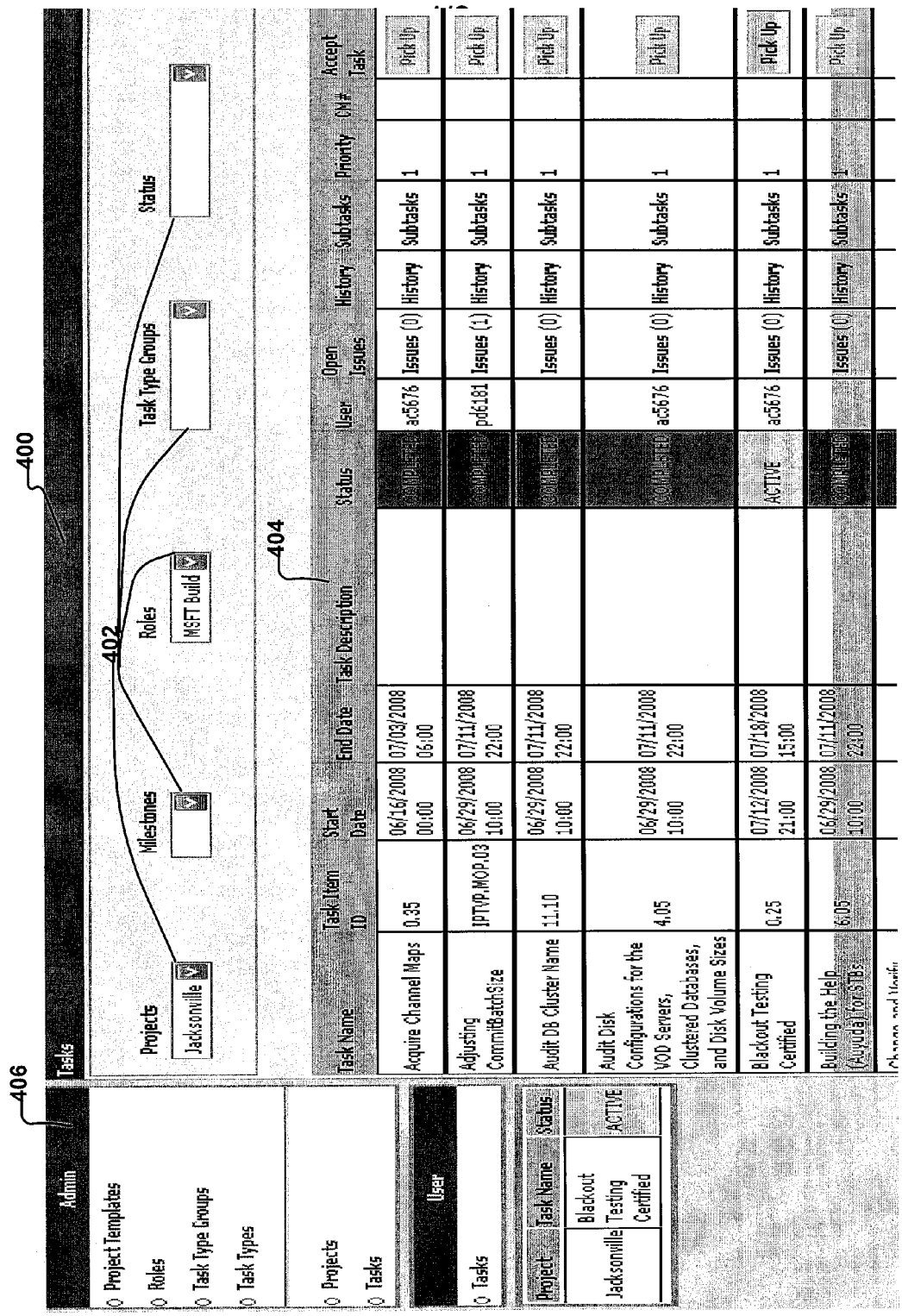
FIG. 4 depicts an example user interface that may be integrated into the workflow management system.

FIG. 4 depicts an example user interface 400 that may be available from the User Interface Module 116. The example user interface 400 may have access to each process of Task Creation 206, Task Performance 208, Task Reporting 208, and Communications 210. The user interface may include pull-down tabs 402 for user selection of projects, milestones, roles, task type groups, and status, for example. The information 404 may include information about a task name, task item ID, start date, end date, task description and status. The task may be assigned to a user. Open issues, History, and Sub-Tasks may be accessible through this view. A summary may be displayed at 406.

The user interface depicted here may be populated based on the interaction of the Knowledge Base Module 118 and the Work Items Module 116, for example. As new tasks are created, the user may use the Task Creation 206 process to organize the tasks appropriately among the servers. Task Performance 208 may enable the assignment and performance of sub-tasks. Task Reporting 208 may provide the overall status of the project or of individual work items. Communications 210 may be an interface that shares, broadcasts, or otherwise communicates high priority issues and overdue statuses relating to the project. A user may make changes via the user interface to dynamically change the time line of work items that are created, reported, communicated, or performed, for example. The user interface, such as those provided by User Interface Module 118, may expose potential missed dates and work force loads based on all the work tasks that need to be completed before crucial deadlines.

Figure 5:
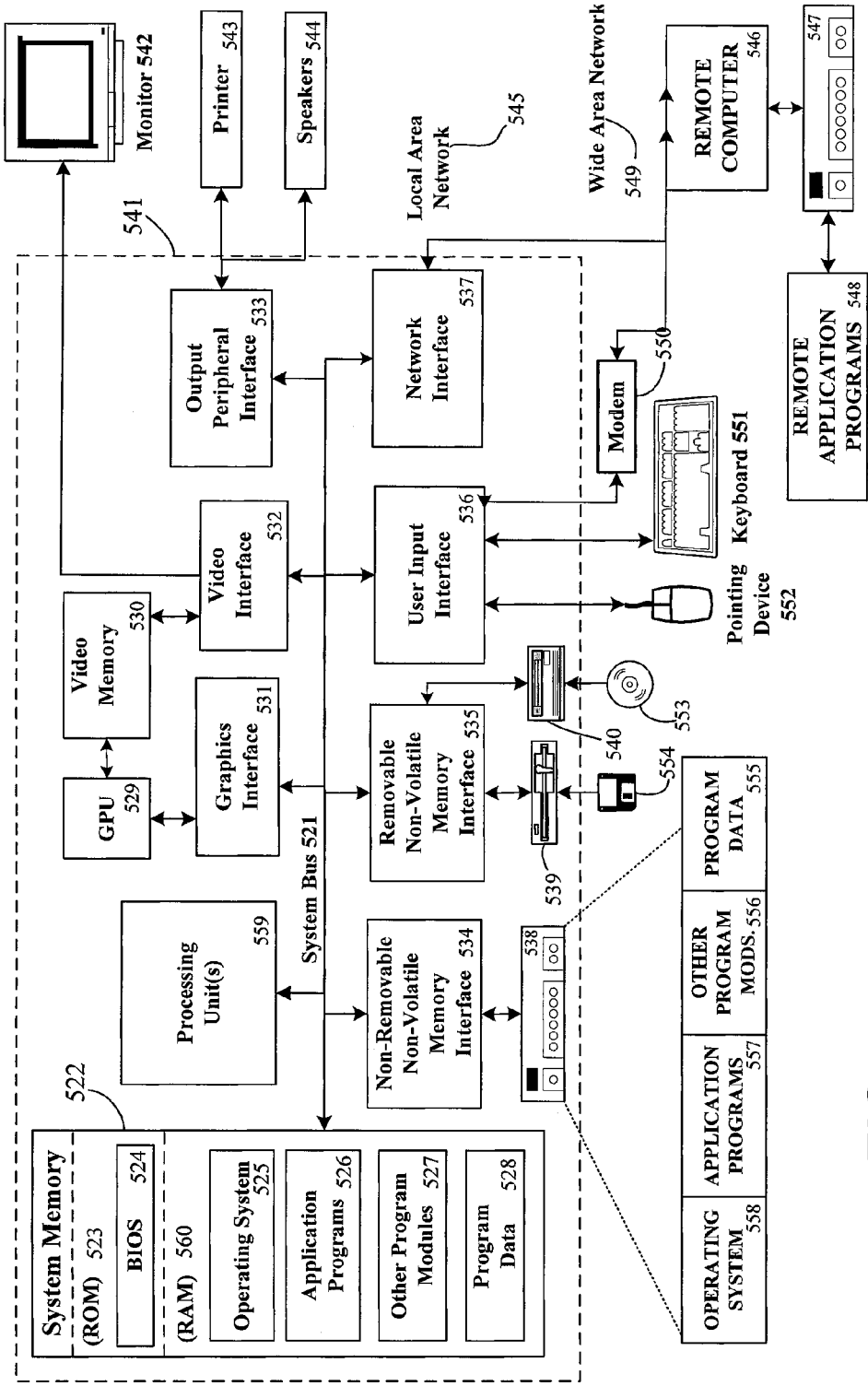
FIG. 5 illustrates functional components of an example computing environment for use with the presently disclosed subject matter.

Turning to FIG. 5, illustrated is a block diagram representing an exemplary computing device that may be suitable for implementing the workflow management system disclosed herein. Numerous embodiments of the present disclosure may execute on a computer. For example, the computer executable instructions that carry out the processes and methods for providing PC experiences on gaming consoles may reside and/or be executed in such a computing environment as shown in FIG. 1.

The computing system environment 520 is only one example of a suitable computing environment and is not intended to suggest any limitation as to the scope of use or functionality of the presently disclosed subject matter. Neither should the computing environment 520 be interpreted as having any dependency or requirement relating to any one or combination of components illustrated in the exemplary operating environment 520. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit.

Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 541 typically includes a variety of computer readable media. Computer readable media can be any available media that can be accessed by computer 541 and includes both volatile and nonvolatile media, removable and non-removable media. The system memory 522 includes computer storage media in the form of volatile and/or nonvolatile memory such as read only memory (ROM) 523 and random access memory (RAM) 560. A basic input/output system 524 (BIOS), containing the basic routines that help to transfer information between elements within computer 541, such as during start-up, is typically stored in ROM 523. RAM 560 typically contains data and/or program modules that are immediately accessible to and/or presently being operated on by processing unit 559. By way of example, and not limitation, FIG. 5 illustrates operating system 525, application programs 526, other program modules 527, and program data 528.

The computer 541 may also include other removable/non-removable, volatile/nonvolatile computer storage media. By way of example only, FIG. 5 illustrates a hard disk drive 538 that reads from or writes to non-removable, nonvolatile magnetic media, a magnetic disk drive 539 that reads from or writes to a removable, nonvolatile magnetic disk 554, and an optical disk drive 540 that reads from or writes to a removable, nonvolatile optical disk 553 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 538 is typically connected to the system bus 521 through an non-removable memory interface such as interface 534, and magnetic disk drive 539 and optical disk drive 540 are typically connected to the system bus 521 by a removable memory interface, such as interface 535.

The drives and their associated computer storage media discussed above and illustrated in FIG. 5, provide storage of computer readable instructions, data structures, program modules and other data for the computer 541. In FIG. 5, for example, hard disk drive 538 is illustrated as storing operating system 558, application programs 557, other program modules 556, and program data 555. Note that these components can either be the same as or different from operating system 525, application programs 526, other program modules 527, and program data 528. Operating system 558, application programs 557, other program modules 556, and program data 555 are given different numbers here to illustrate that, at a minimum, they are different copies. A user may enter commands and information into the computer 541 through input devices such as a keyboard 551 and pointing device 552, commonly referred to as a mouse, trackball or touch pad. Other input devices (not shown) may include a microphone, joystick, game pad, satellite dish, scanner, or the like. These and other input devices are often connected to the processing unit 559 through a user input interface 536 that is coupled to the system bus, but may be connected by other interface and bus structures, such as a parallel port, game port or a universal serial bus (USB). A monitor 542 or other type of display device is also connected to the system bus 521 via an interface, such as a video interface 532. In addition to the monitor, computers may also include other peripheral output devices such as speakers 544 and printer 543, which may be connected through a output peripheral interface 533.

The computer 541 may operate in a networked environment using logical connections to one or more remote computers, such as a remote computer 546. The remote computer 546 may be a personal computer, a server, a router, a network PC, a peer device or other common network node, and typically includes many or all of the elements described above relative to the computer 541, although only a memory storage device 547 has been illustrated in FIG. 5. The logical connections depicted in FIG. 5 include a local area network (LAN) 545 and a wide area network (WAN) 549, but may also include other networks. Such networking environments are commonplace in offices, enterprise-wide computer networks, intranets and the Internet.

When used in a LAN networking environment, the computer 541 is connected to the LAN 545 through a network interface or adapter 537. When used in a WAN networking environment, the computer 541 typically includes a modem 550 or other means for establishing communications over the WAN 549, such as the Internet. The modem 550, which may be internal or external, may be connected to the system bus 521 via the user input interface 536, or other appropriate mechanism. In a networked environment, program modules depicted relative to the computer 541, or portions thereof, may be stored in the remote memory storage device. By way of example, and not limitation, FIG. 5 illustrates remote application programs 548 as residing on memory device 547. It will be appreciated that the network connections shown are exemplary and other means of establishing a communications link between the computers may be used.

Figure 6:
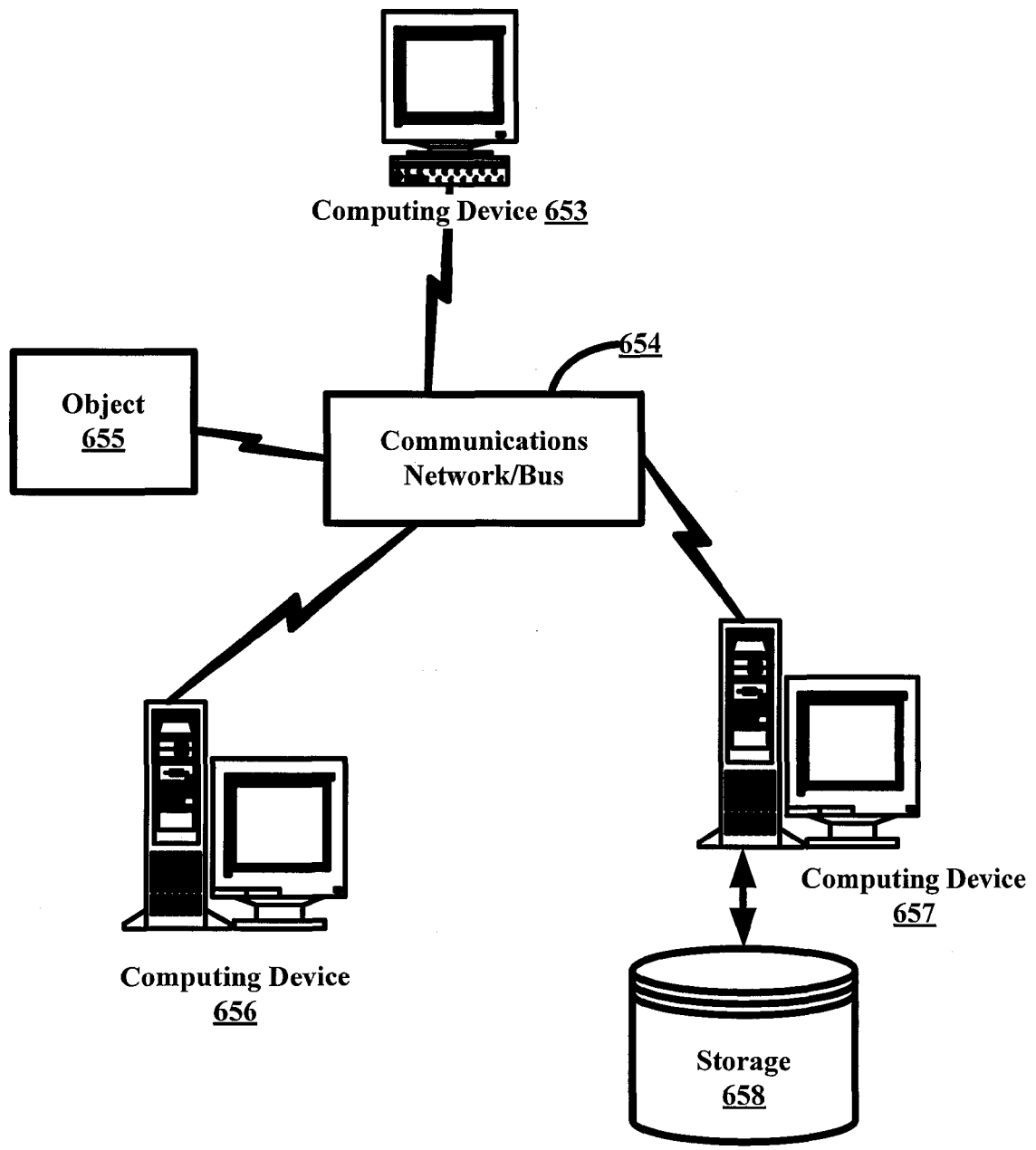
FIG. 6 illustrates functional components of an example networking environment for use with the presently disclosed subject matter.

FIG. 6 provides a schematic diagram of an exemplary networked or distributed computing environment that may implement the workflow management system disclosed herein. The environment comprises computing devices 653, 656, and 657 as well as object 655 and database 658. Each of these entities 653, 655, 656, 657, and 658 may comprise or make use of programs, methods, data stores, programmable logic, etc. The entities 653, 655, 656, 657, and 658 may span portions of the same or different devices such as PDAs, audio/video devices, MP3 players, smart phones, DVD players, cable box tuners, or just about any computing devices capable of remote content provided by server PCs. Each entity 653, 655, 656, 657, and 658 can communicate with another entity 653, 655, 656, 657, and 658 by way of the communications network 654. In this regard, any entity may be responsible for the maintenance and updating of a database 658 or other storage element.

This network 654 may itself comprise other computing entities that provide services to the system of FIG. 1 or FIG. 2, and may itself represent multiple interconnected networks. In accordance with an aspect of the presently disclosed subject matter, each entity 653, 655, 656, 657, and 658 may contain discrete functional program modules that might make use of an API, or other object, software, firmware and/or hardware, to request services of one or more of the other entities 653, 655, 656, 657, and 658.

It can also be appreciated that an object, such as 655, may be hosted on another computing device 656. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. Any entity 653, 655, 656, 657, and 658 can be considered a client, a server, or both, depending on the circumstances. And, moreover, regarding the entertainment console, it can be a client to a server.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 5 and the further diversification that can occur in computing in a network environment such as that of FIG. 6, the systems and methods provided herein cannot be construed as limited in any way to a particular computing architecture or operating system. Instead, the presently disclosed subject matter should not be limited to any single embodiment, but rather should be construed in breadth and scope in accordance with the appended claims. Thus, for example, although game consoles and server PCs have been discussed, just as easily full desktops could be remoted to smart phones as a means to access data and functionality that is otherwise unavailable to smart phones.

Finally, it should also be noted that the various techniques described herein may be implemented in connection with hardware or software or, where appropriate, with a combination of both. Thus, the methods, computer readable media, and systems of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present disclosure, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

What is claimed:

1. A method comprising:
   managing, by a processor, a project in a hierarchical arrangement, the hierarchical arrangement comprising a plurality of work groups, a plurality of tasks, and a plurality of sub-tasks, wherein related work groups, tasks, and sub-tasks are managed by a common server, the common server comprising:
   a user interface module comprising:
      a first a user-interface for creating and correcting the hierarchical arrangement;
      a second user interface for assigning and performing the sub-tasks;
      a third user interface for providing status of the project;
      a fourth user interface for providing an indication of priority issues and overdue statuses;
   a work items module for managing work flow of work items; and
   a knowledge base module for testing and verifying the work items via help features of a knowledge database;
   storing information related to the project in a central location, wherein a user interface may provide access to the information from any component networked to the central location;
   launching at least one script to manage the project, wherein the script integrates system automation into the management of the project; and
   providing access to the knowledge database with help features related to managing the project, the help features comprising a tutorial regarding managing the project.

2. The method of claim 1, wherein managing the project is performed via a ticketing system, where a ticket is assigned to the project and stores and tracks a status of the project.

3. The method of claim 1, wherein the user interface may be a user interface for at least one of the following: task creation, task performance, task reporting, or communication of information related to the project.

4. The method of claim 1, wherein the user interface is adapted such that a user can dynamically change a time line of the project.

5. The method of claim 1, wherein the project is defined by a combination of projects associated to multiple servers, and completion of the projects represents completion of the project.

6. The method of claim 1, wherein the project is a Video Hub Office project.

7. The method of claim 1, wherein the script integrates system automation into the management of the project.

8. The method of claim 1, further comprising initiating, tracking, and storing projects, providing interdepartmental communication, accountability, knowledge retention, and automation.

9. The method of claim 1, further comprising logging issues and tracking the issues to resolution, wherein information about the logging and tracking is transferred to the knowledge database.

10. A central server comprising a processor;
memory coupled to the processor, the memory comprising executable instructions that when executed by the processor cause the processor to effectuate operations comprising:
managing a project, the project being is managed in a hierarchical arrangement comprising a plurality of work groups, a plurality of tasks, and a plurality of sub-tasks, wherein related work groups, tasks, and sub-tasks are managed by the central server, the central server comprising:
a user interface module comprising:
a first a user-interface for creating and correcting the hierarchical arrangement;
a second user interface for assigning and performing the sub-tasks;
a third user interface for providing status of the project;
a fourth user interface for providing an indication of priority issues and overdue statuses;
a work items module for managing work flow of work items; and
a knowledge base module for testing and verifying the work items via help features of a knowledge database;
accessing, via the user interface module, information related to the project stored in the computing memory, wherein the user interface module provides access to the information from any component networked to a central location;
providing access to the knowledge database with help features related to managing the project, the help features comprising a tutorial regarding managing the project; and
launching at least one script to manage the project, wherein the script integrates system automation into the management of the project.

11. The central server of claim 10, the operations further comprising:
storing a status of the project; and
tracking the status of the project.

12. The central server of claim 10, wherein the user interface accommodates at least one of: task creation, task performance, task reporting, or communication of information related to the project.

13. The central server of claim 10, wherein the user interface is adapted such that a user can dynamically change a time line of the project.

14. The central server of claim 10, wherein the project is defined by a combination of projects associated to multiple servers, and completion of the projects represents completion of the project.

15. The central server of claim 10, wherein the project is a Video Hub Office project.

16. The central server of claim 10, wherein managing workflow comprises initiating, tracking, and storing project, providing interdepartmental communication, accountability, knowledge retention, and automation.

17. The central server of claim 10, wherein the script integrates system automation into the management of the project.

18. The central server of claim 10, further comprising a logging and tracking module for logging issues and tracking the issues to resolution, wherein information about the logging and tracking is transferred to the knowledge database.

19. A tangible computer-readable storage medium that is not a propagating signal, the tangible computer-readable storage medium comprising computer-executable instructions that when executed by a processor cause the processor to effectuate operations comprising:
managing a project, the project being managed in a hierarchical arrangement comprising a plurality of work groups, a plurality of tasks, and a plurality of sub-tasks, wherein related work groups, tasks, and sub-tasks are managed by a common server, the common server comprising:
a user interface module comprising:
a first a user-interface for creating and correcting the hierarchical arrangement;
a second user interface for assigning and performing the sub-tasks;
a third user interface for providing status of the project;
a fourth user interface for providing an indication of priority issues and overdue statuses;
a work items module for managing work flow of work items; and
a knowledge base module for testing and verifying the work items via help features of a knowledge database;
storing information related to the project in a central location, wherein the user interface module may provide access to the information from any component networked to the central location;
launching at least one script to manage the project, wherein the script integrates system automation into the management of the project; and
providing access to the knowledge database with help features related to managing the project, the help features comprising a tutorial regarding managing the project.

20. The computer-readable storage medium of claim 19, wherein managing the project is performed via a ticketing system that assigns a ticket to the project and stores and tracks the status of the project.

21. The computer-readable storage medium of claim 19, wherein the user interface may be a user interface for at least one of the following: task creation, task performance, task reporting, or communication of information related to the project.

22. The computer-readable storage medium of claim 19, wherein the user interface is adapted such that a user can dynamically change a time line of the project.

23. The computer-readable storage medium of claim 19, wherein the project is defined by a combination of projects associated to multiple servers, and completion of the projects represents completion of the project.

24. The computer-readable storage medium of claim 19, wherein the project is a Video Hub Office project.

25. The computer-readable storage medium of claim 19, wherein managing workflow comprises initiating, tracking, and storing projects, providing interdepartmental communication, accountability, knowledge retention, and automation.

26. The computer-readable storage medium of claim 19, wherein the script integrates system automation into the management of the project.

27. The computer-readable storage medium of claim 19, the operations further comprising logging issues and tracking the issues to resolution, wherein information about the logging and tracking is transferred to the knowledge database.

* * * * *

UNITED STATES PATENT AND TRADEMARK OFFICE
CERTIFICATE OF CORRECTION

PATENT NO.         : 9,009,725 B2
APPLICATION NO.    : 12/203046
DATED              : April 14, 2015
INVENTOR(S)        : Biondi et al.

Page 1 of 1

It is certified that error appears in the above-identified patent and that said Letters Patent is hereby corrected as shown below:

On the title page item [73],
Delete "AT&T Mobility II LLC, Atlanta, GA (US)" and insert -- AT&T Intellectual Property I, L.P., Atlanta, GA (US) --.

Signed and Sealed this
Seventh Day of July, 2015

Michelle K. Lee
*Director of the United States Patent and Trademark Office*